United States Patent Office 2,809,319
Patented Oct. 8, 1957

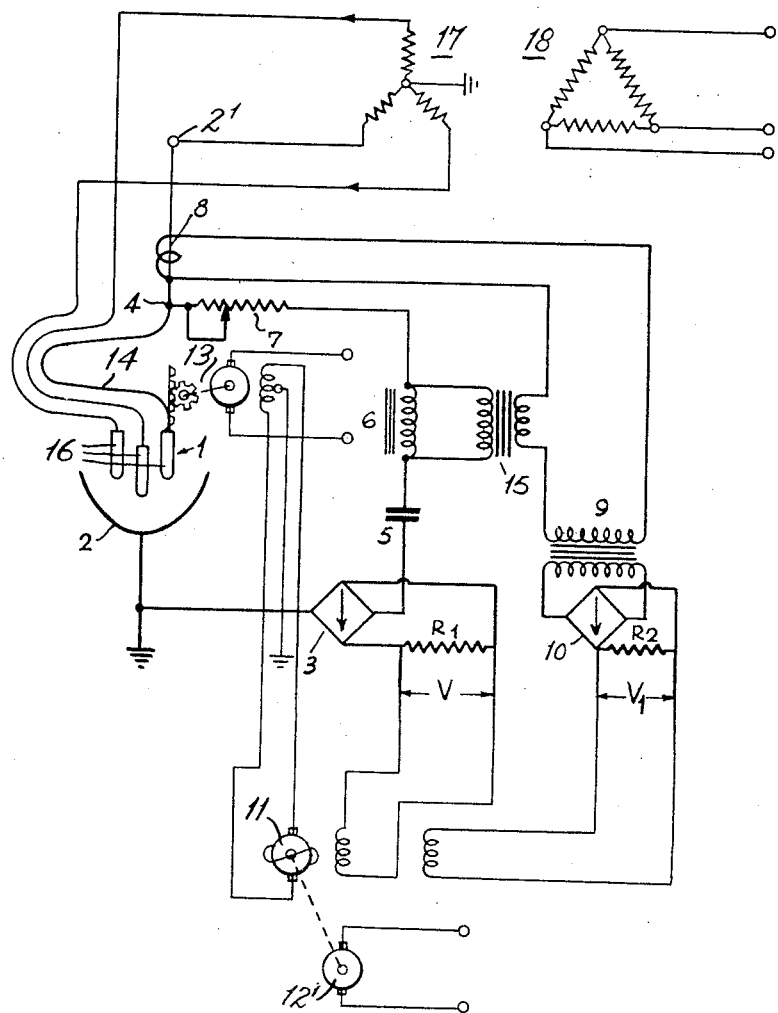

2,809,319

ELECTRIC ARC FURNACES

Owen Stevenson Steele, Bilton, Rugby, and Ian Stanley Robertson, Rugby, England, assignors to The British Thomson-Houston Company Limited, London, England, a British company Application October 11, 1956, Serial No. 615,372

Claims priority, application Great Britain October 31, 1955

4 Claims. (Cl. 314—75)

This invention relates to the automatic control of the position of the electrode in an electric A. C. arc furnace whereby to maintain substantially constant the arc current.

It is well-known to adjust the position of the electrode by moving the electrode support by means of a reversible electric D. C. motor which is excited in dependence on a voltage proportional to the difference between current in, and the voltage across, the arc. A control voltage responsive to arc current is readily obtainable by means of a current transformer, the primary winding of which is arranged in the circuit which conveys current to the arc. The control voltage responsive to the voltage across the arc is also obtainable by means of a voltage transformer the primary winding of which is connected between the electrode and earth, the charge in the furnace being at earth potential.

It is not practicable to measure the voltage across the arc directly, and it has therefore been common practice to measure the busbar voltage, and assume that this is approximately the arc voltage. On larger furnaces, however, it has been found that a considerable error will result unless allowance is made for the voltage drop in the cable between the measuring point and the arc.

It is the object of the present invention to achieve the required compensation, and to allow the substantially true reading of the arc voltage to be obtained at the busbars.

According to the invention there is introduced into the voltage measuring circuit a component of voltage which compensates for the drop in voltage arising from the reactance present in the electrode circuit between the point at which the voltage measuring circuit is connected to the electrode circuit and the arc root, said component being dependent upon the current in the arc so as to compensate for the reactance voltage drop for all values of arc current.

Conveniently, we introduce into the voltage measuring circuit a reactor, the impedance of which simulates the impedance of that part of the electrode circuit which introduces the drop in voltage for which compensation is required, and produce through the reactor a current derived from the arc current measuring circuit; the component of voltage thereby introduced into the voltage measuring circuit is made to be of opposite phase to that of the voltage which is derived directly from the electrode circuit so as to produce the required compensation.

A convenient way of carrying out the invention is illustrated in the accompanying drawing which shows the circuit arrangement as applied to one electrode of an A. C. arc furnace.

In the arrangement illustrated the furnace electrode is shown at 1, the body of the furnace containing the charge to be melted being shown at 2, and being connected to earth, as indicated. Current from a suitable A. C. source, of which one terminal is indicated at 2', is supplied to electrode 2, the other terminal of the source being connected to earth. A D. C. voltage V, proportional to arc voltage is developed across resistor $R_1$ by means of a voltage measuring circuit including a bridge rectifier 3, connected to the voltage measuring point 4, through a capacitor 5 and a reactor 6. It is also convenient to include in this circuit a variable resistance 7 which is preset according to the voltage at which the furnace is operating.

A D. C. control voltage $V_1$ proportional to arc current is obtained from a current measuring circuit including a current transformer 8, the primary winding of which is included in the lead to the electrode.

The output current from current transformer 8 is passed to a transformer 9, is rectified by rectifier 10 and is developed across resistor $R_2$. Voltages V and $V_1$ may be utilised, in known manner, to control the voltage of an amplidyne exciter 11 driven by motor 12 which is used to excite a reversible D. C. motor 13 which controls the movement of the electrode.

In order to compensate for the reactance drop in the lead, indicated at 14, between point 4 at which the voltage connection is made and the arc root on electrode 1, there is introduced, in accordance with the invention, a component of voltage proportional to arc current. This is obtained by including reactor 6 in the voltage measuring circuit and passing a current proportional to the arc current through the reactor 6, a matching transformer 15 being used, if desired, whereby to develop across the reactor a voltage proportional to the voltage drop between the voltage measuring connection and the tip of the electrode, and in opposite phase thereto. The impedance of the reactor 6 is made to simulate the impedance of the lead between point 4 and the electrode tip and its design must be such that when the signal current is flowing through it, the voltage developed across it is representative of the voltage drop due to the reactance and preferably, but not essentially, also the resistance of the electrode circuit, and that this must apply not only to the value but also to the phase angle. It will also be appreciated that any variation in electrode current will affect both circuits similarly, since the compensating current flowing through the reactor is derived from the arc current.

In such an arrangement the resultant voltage signal measured across the resistor $R_1$ will be representative of the true arc voltage.

The capacitor 4 is included to compensate for the quadrature component of the voltage across reactor 6. If the reactance value of capacitor 5 is the same as that of the reactor 6, there will be no quadrature component of voltage drop across the combination due to the current flowing in the voltage signal lead, and this will be true irrespective of variations in the value of the operating voltage or the regulating resistance.

It is understood that there would generally be two further electrodes 16 to the furnace, the three electrodes being separately supplied from the three phases of the customary polyphase current source which is indicated by means of the Y-connected secondary winding 17 of a three-phase transformer 18, the primary winding of which is connected to a suitable three-phase supply.

What we claim is:

1. In an electric arc furnace, an electrode, a source of alternating current supply connected to said electrode, a reversible D. C. motor, means connecting said motor operatively to said electrode, a D. C. generator connected to supply current to said motor, means for deriving from said supply a first direct voltage proportional to the voltage supplied to said electrode, means for deriving from the supply to said electrode a second direct voltage proportional to the arc current flowing to said electrode, means for modifying said first voltage by a component voltage responsive to said arc current whereby said first voltage accurately represents the voltage across the arc, and means for exciting said D. C. generator by said first and second voltages whereby said D. C. motor is caused to adjust the position of said electrode whereby to maintain said arc current substantially constant.

2. In an electric arc furnace, an electrode, a source of alternating current supply connected to said electrode, a current transformer having its primary winding connected to be energised by the arc current supplied to said electrode, a first circuit for obtaining from the secondary winding of said current transformer a voltage proportional to said arc current, a matching transformer having its primary winding connected in said circuit, a second circuit connected to said source for obtaining a second voltage proportional to the voltage of said source, said second circuit containing a reactor, means connecting the secondary winding of said matching transformer to said reactor whereby to develop across said reactor a voltage component proportional to said arc current and in phase opposition to the voltage developed across said reactor proportional to that of said source, means for rectifying said first and second voltages, and means for exciting said D. C. generator by said first and second voltages whereby said D. C. motor is caused to adjust the position of said electrode whereby to maintain said arc current substantially constant.

3. In an electric arc furnace, an electrode, a source of alternating current supply connected to said electrode, a current transformer having its primary winding connected to be energised by the arc current supplied to said electrode, a first circuit for obtaining from the secondary winding of said current transformer a voltage proportional to said arc current, a second circuit connected to said source for obtaining a second voltage proportional to the voltage of said source, said second circuit containing a reactor, means for developing across said reactor a component voltage proportional to said arc current and obtained from said first circuit, said voltage being in phase opposition to the voltage across said reactor proportional to the voltage of said source, a capacitor in series with said reactor in said second circuit, means for rectifying said first and second voltages, and means for exciting said D. C. generator by said first and second voltages whereby said D. C. motor is caused to adjust the position of said electrode whereby to maintain said arc current substantially constant.

4. In an electric arc furnace, an electrode, a source of alternating current supply connected to said electrode, a reversible D. C. motor, means connecting said motor operatively to said electrode, an amplidyne generator connected to supply current to said motor, said generator having two control windings, means for deriving from said supply a first direct voltage proportional to the voltage supplied to said electrode, means for deriving from the supply to said electrode a second direct voltage proportional to the arc current flowing to said electrode, means for modifying said first voltage by a component voltage responsive to said arc current whereby said first voltage accurately represents the voltage across the arc, means for exciting one of said control windings with a current obtained from said first voltage, means for exciting the second of said control windings with a current obtained from said second voltage, whereby said amplidyne generator is caused to supply current of reversible polarity to said reversible D. C. motor and thereby to cause rotation of said motor in a direction such as to adjust said electrode in a manner to maintain said arc current substantially constant.

References Cited in the file of this patent

UNITED STATES PATENTS

| 2,375,039 | Reichert | May 1, 1945 |
| 2,427,587 | Bloodworth | Sept. 6, 1947 |
| 2,427,617 | Montgomery | Sept. 6, 1947 |